United States Patent [19]

Hardtke

[11] Patent Number: 4,930,732
[45] Date of Patent: Jun. 5, 1990

[54] YOKE PIPE CLIP

[75] Inventor: Hans-Herlof Hardtke, Zeven, Fed. Rep. of Germany

[73] Assignee: Lisega GmbH, Fed. Rep. of Germany

[21] Appl. No.: 351,637

[22] Filed: May 15, 1989

[30] Foreign Application Priority Data

May 19, 1988 [DE] Fed. Rep. of Germany ....... 3817059

[51] Int. Cl.⁵ .............................................. F16L 3/00
[52] U.S. Cl. ......................................... 248/62; 24/19; 248/74.1; 248/74.4
[58] Field of Search ..................... 248/62, 59, 60, 74.1, 248/74.4, 74.5, 65, 67.5, 56, 57, 55, 58; 24/268, 19, 20 LS

[56] References Cited

U.S. PATENT DOCUMENTS

| 1,639,635 | 8/1927 | Seyfert | 248/59 |
| 2,632,676 | 3/1953 | Everett, Sr. | 248/58 X |
| 3,872,947 | 3/1975 | Cranfield | 248/65 X |
| 3,936,684 | 2/1976 | Anselmino et al. | 248/74.4 X |
| 4,143,844 | 3/1979 | Van Meter | 248/62 |
| 4,176,815 | 12/1979 | Davidson et al. | 248/59 X |

FOREIGN PATENT DOCUMENTS

| 223298 | 5/1987 | European Pat. Off. | 248/59 |
| 685957 | 3/1965 | Italy | 248/62 |
| 402145 | 11/1933 | United Kingdom | 248/59 |

Primary Examiner—David L. Talbott
Attorney, Agent, or Firm—Diller, Ramik & Wight

[57] ABSTRACT

A yoke pipe clip for supporting pipes comprises a pair of generally parallel longitudinal plates in side-by-side spaced relationship, a pair of generally transverse plates disposed one at each opposite end of the longitudinal plates, a suspension bracket positioned between the opposite ends of the longitudinal plates, a yoke, and interlocked slot and lug connections for securing the suspension bracket to the longitudinal plates and also for securing the longitudinal and transverse plates to each other.

18 Claims, 3 Drawing Sheets

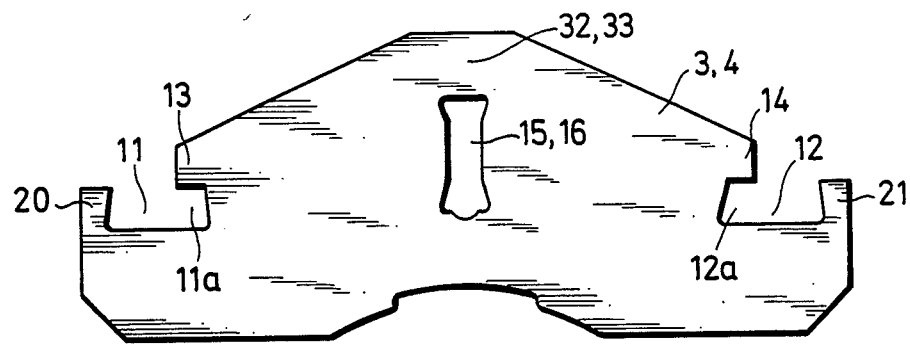
FIG. 3
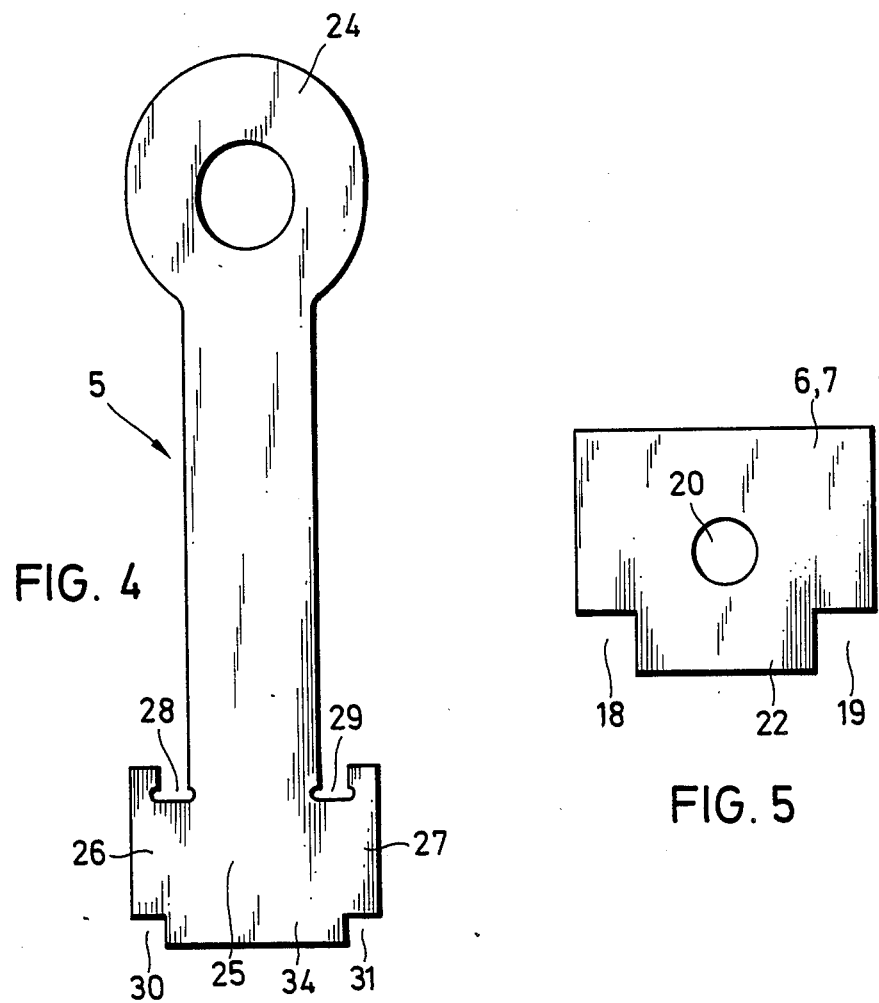
FIG. 4
FIG. 5

YOKE PIPE CLIP

BACKGROUND OF THE INVENTION

The invention relates to a yoke pipe clip for suspendingly supporting pipes or the like comprising a bearing support, a mounting clip, and at least one curved steel yoke adapted to be fastened to transverse plates of the bearing support.

Yoke pipe clips are used for suspending or supporting pipes, particularly in power station applications. Such yoke clips are specifically designed to support dynamic forces through a positive connection with an associated pipe line.

The construction of conventional yoke pipe clips is quite expensive because the major components are either bent hot or are made of a welded design in which the bearing support, the mounting clip and the transverse plates for receiving the curved steel yoke form a unit. The latter is also true in cases where the yoke pipe clips are also involved and heavy.

SUMMARY OF THE INVENTION

It is an object of the invention to provide a yoke pipe clip whose elements may be easily interconnected and in which a considerable saving in weight is achieved. The invention is characterized in that the bearing support of the yoke clip is made of individual plate elements, viz. two longitudinal plates, two transverse plates to receive the curved steel yoke and a mounting or suspension plate. These individual independent plates are locked together by means of slot connecting members.

Due to the construction of the yoke pipe clip of the present invention, manufacture and assembly are considerably simplified. At the same time weight is reduced extraordinarily to about 75%, as compared to the weight of prior designs. Further, transportation volume and cost are decreased. As a result of the saving in weight, the yoke pipe clip can be handled more easily. The plate elements forming the bearing support are preferably obtained by punching or flame cutting from sheet plate of a corresponding thickness.

According to another object of the invention, end portions of the longitudinal plates are provided with grooves or slots which open towards the suspension side of the yoke pipe clip and are undercut at the side of the longitudinal plates nearest the center thereof. The transverse plates or plate elements engage these undercuts of the grooves of the longitudinal plates or plate elements. The transverse plates may each be provided with at least one hole to receive an end of the yoke. The bearing support formed this way and composed of two longitudinal plate elements and two transverse plate elements has a generally hollow box shape whose elements are firmly interlocked.

An end of the suspension bracket most adjacent the longitudinal plate elements may be enlarged so that grooves form lugs or pins therein which are inserted in slots of the longitudinal plate elements. A lowermost end of the enlarged portion also has corner cutouts. By the latter means the central plane of the longitudinal plate elements are maintained in locked condition by the suspension clips. As a result, by three bilaterally acting connections, the bearing support defines over its length a rigid generally hollow box. The longitudinal plate members forming the hollow box bearing support are of a corresponding thickness and of a materially high resistance so that the bearing support together with the suspension bracket or clip may withstand high stresses.

The lower portion of the elongated slots of the longitudinal plate elements may be additionally adapted to receive a bolt extending from one longitudinal plate element to the other, thus insuring additional security. At the same time the bolt assures that the suspension clip cannot be removed from the longitudinal slots of the longitudinal plate elements when the yoke is not being used.

With the above, and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 3 is a side elevational view, and illustrates details of one of the two identical longitudinal plate elements.

FIG. 4 is a side elevational view, and illustrates details of the suspension clip.

FIG. 5 is a side elevational, and illustrates details of one of the two identical transverse plate elements.

DESCRIPTION OF THE PREFERRED EMBODIMENT

Figures 1, 2:
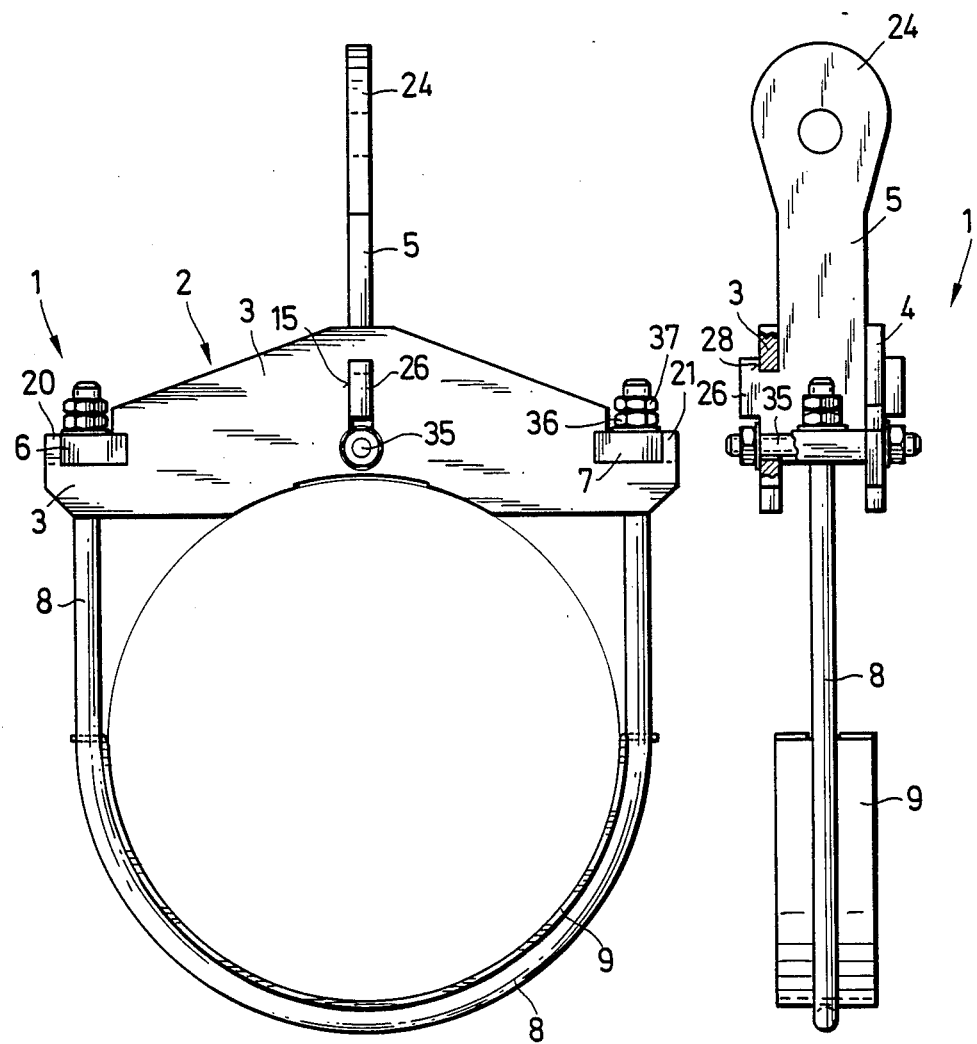
FIG. 1 is an end elevational view of a yoke pipe clip of the invention, and illustrates a pair of longitudinal plate elements, transverse plate elements, a yoke and a suspension clip.
FIG. 2 is a side elevational view, partially in cross section, of the pipe clip of FIG. 1, and illustrates details of the connection between the suspension clip and the longitudinal plate elements.

A novel yoke pipe clip 1 of the invention includes a bearing support or support frame 2 (See FIGS. 1 and 2) constructed from a pair of longitudinal plate elements or plates 3, 4 which are united to form a box shaped configuration. The box shaped support frame 2 comprising the two longitudinal plates 3, 4 between which is connected a mounting or suspension clip 5. The suspension clip 5 is mounted centrally of and between transverse plates 6, 7 positioned at ends (unnumbered) of the longitudinal plates 3, 4. A curved steel yoke 8 has free ends (unnumbered) which are threaded and fastened to the transverse plates 6, 7 by pairs of nuts 36, 37. A lower part of the curved steel yoke 8 may be provided with a lining plate 9.

The ends of the longitudinal plates 3, 4 have grooves 11, 12 directed towards the suspension side (open upwardly) and are provided with undercuts 11a, 12a at the sides facing or most adjacent the center plane of the plates 3, 4 thus resulting in projections, pins or lugs 13, 14. The center of the longitudinal plates 3, 4 includes elongated slots 15, 16 (FIG. 3) which are engaged by the lateral projections of the suspension clip or bracket 5.

Figure 6:
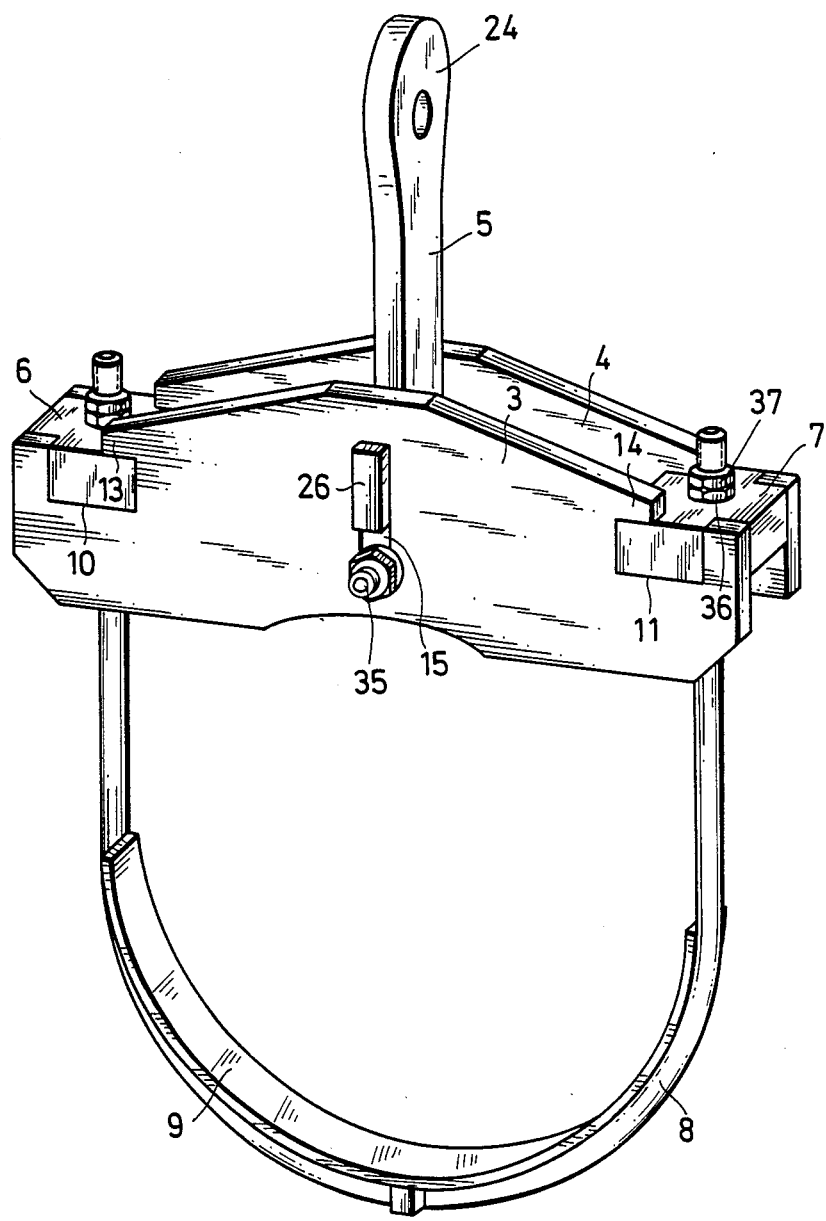
FIG. 6 is a perspective view of the yoke type pipe clip, and illustrates with additional particularity the elements shown in FIG. 1.

The transverse plates 6, 7 are polygonal or rectangular plate members along one side of which there are located rectangular or polygonal cutouts 18, 19. The transverse plates 6, 7 have at least one bore 20 to pass therethrough the free threaded ends of the yoke 8. The transverse plates 6, 7 are inserted in the grooves 11, 12 of the longitudinal plates 3, 4 with the two grooves 11, 12 engaging corner cutouts 18, 19 of the transverse plates 6, 7. The other ends of the transverse plates 6, 7 opposite the cutouts 18, 19 are positioned beneath the projections or projecting portions 13, 14 of the longitudinal plates 3, 4. (See FIGS. 1 and 6.) The width of the hollow box-shaped bearing support 2 is determined by the intermediate portion 22 (FIG. 5) of the transverse plates 6, 7 spanning the distance between the cutouts 18, 19. One end of the suspension or mounting clip 5 is provided with an eye 24 while its other end includes an enlarged portion or enlargement 25. Projecting portions, projections, lugs or pins 26, 27 of the suspension clip 5 contain grooves 28, 29, and the other end is provided with corner cutouts 30, 31 on opposite sides of a portion 34. The projecting portions 26, 27 engage through the elongated slots 15, 16 of the longitudinal plates 3, 4, while central portions 32, 33 of the longitudinal plates 3, 4 engage in the grooves 28, 29 of the suspension clip 5. As result thereof there is created a bayonet-type locking of the longitudinal plates 3, 4 with the suspension clip 5. The length of portion 34 between the corner cutouts 30 and 31 corresponds to the portion 22 of the transverse plates 6, 7. Therefore, both the ends and the center of the box shaped bearing support 2 are interlocked by a bayonet connection by the transverse plates 6, 7 and the suspension clip 5.

Fastening means in the form of a bolt 35 is mounted in the lower part of the elongated slots 15, 16 in spanning relationship to the longitudinal plates 3, 4 which serves as an additional safety measure for maintaining the box shape of the support frame 2 when the yoke clip is not in use. The threaded ends of yoke 8 extending through the openings 20 of the transverse plates 6, 7 is also fixed to the bearing support 2 by the nut 36 and the locknut 37, as heretofore described, to assure that the support frame 2 will not disassemble from the yoke 8.

As can be readily appreciated from the foregoing description, first interlocking securing means between the ends of the plates 3, 4 and the plates 6, 7 together with second interlocking securing means between the suspension bracket 5 and the plates 3, 4 maintain the generally rigid box-shaped configuration of the bearing support 2, yet effect rapid assembly and disassembly thereof.

Although a preferred embodiment of the invention has been specifically illustrated and described herein, it is to be understood that minor variations may be made in the apparatus without departing from the spirit and scope of the invention as defined in the appended claims.

I claim:

1. A pipe clip for supporting pipe comprising a pair of generally longitudinal plates in side-by-side relationship, a pair of generally transverse plates disposed one each at opposite ends of said longitudinal plates, a suspension bracket positioned between said opposite ends, a yoke, means for securing said yoke to said transverse plates, first means for interlockingly securing said transverse plates to said longitudinal plates at each of said opposite ends, second means for interlockingly securing said longitudinal plates to said suspension bracket, said first interlocking securing means include cooperatively engaged projections and slots, and said second interlocking securing means include cooperatively engaged projections and slots.

2. The pipe clip as defined in claim 1 wherein said first and second interlocking securing means each include cooperatively engaged projections and slots.

3. The pipe clip as defined in claim 1 wherein said first interlocking securing means include upwardly opening slots in upper edges of said longitudinal plates opposite ends, and said transverse plates are seated in said upwardly opening slots.

4. The pipe clip as defined in claim 1 wherein said first interlocking securing means include a slot in each longitudinal plate end, said slots each have a blind end and an open end, said blind ends of each longitudinal plate are more adjacent each other than said open ends, said open ends open through upper edges of said longitudinal plates, said upper edges and blind ends define oppositely directed projections of each longitudinal plate, and said transverse plates are each received in associated ones of said open and blind ends and beneath associated ones of said projections.

5. The pipe clip as defined in claim 1 wherein said first interlocking securing means include a slot in each longitudinal plate end, each slot opens in an upward direction and sets-off an upwardly directed projection at each longitudinal plate end, each transverse plate includes a pair of transversely opposite slots in part defining oppositely transversely directed projections, each transverse plate being seated at an associated one of said longitudinal plate ends with said transverse plate slots each receiving an associated one of said upwardly directed projections, and each transverse plate transverse projection being received in an associated one of said longitudinal plate slots.

6. The pipe clip as defined in claim 1 wherein said yoke securing means includes an opening in each transverse plate, said yoke include opposite ends, and each yoke end is received in an associated one of said transverse plate openings.

7. The pipe clip as defined in claim 1 wherein said second interlocking securing means include a pair of projections and a pair of elongated slots, each of said projections being received in an associated one of said pair of elongated slots, one of said pair of projections and slots being defined by said suspension bracket, and another of said pair of projections and slots being defined by said longitudinal plates.

8. The pipe clip as defined in claim 7 wherein said first interlocking securing means includes an upwardly directed projection outboard of an upwardly opening slot in an upper edge of each longitudinal plate opposite end, said first interlocking securing means further includes a relieved area at each of two transversely adjacent corners of each of said transverse plates, and each transverse plate is seated in spanning relationship between transversely adjacent pairs of said slots with a projection seated in an associated relieved area.

9. The pipe clip as defined in claim 1 wherein said second interlocking securing means include a pair of upwardly opening and upwardly projecting slots and projections respectively of said suspension bracket and elongated slots in each of said longitudinal plates, said upwardly projecting slots are separated by a central portion of said suspension bracket, and each longitudinal plate is received in one of said upwardly projecting slots.

10. The pipe clip as defined in claim 1 wherein said second interlocking securing means include a pair of oppositely transversely projecting projections and elongated slots of said suspension bracket and longitudinal plates respectively, a relieved area adjacent each transversely projecting projection, and each transversely projecting projection being received in one of said elongated slots with each relieved area resting upon an edge of its associated elongated slot.

11. The pipe clip as defined in claim 1 wherein said second interlocking securing means include a pair of oppositely transversely projecting projections carried by said suspension bracket and elongated slots formed in said plates, said suspension bracket being in generally transverse spanning relationship to said longitudinal plates, each of said projections being housed in an associated one of said slots, and fastening means positioned in spanning relationship between said elongated slots and between each slot and its associated projection for fastening together said suspension bracket and said longitudinal plates.

12. The pipe clip as defined in claim 11 wherein said first interlocking securing means includes an upwardly directed projection outboard of an upwardly opening slot in an upper edge of each longitudinal plate opposite end, said first interlocking securing means further includes a relieved area at each of two transversely adjacent corners of each of said transverse plates, and each transverse plate is seated in spanning relationship between transversely adjacent pairs of said slots with a projection seated in an associated relieved area.

13. The pipe clip as defined in claim 1 wherein said first interlocking securing means includes an upwardly directed projection outboard of an upwardly opening slot in an upper edge of each longitudinal plate opposite end, said first interlocking securing means further includes a relieved area at each of two transversely adjacent corners of each of said transverse plates, and each transverse plate is seated in spanning relationship between transversely adjacent pairs of said slots with a projection seated in an associated relieved area.

14. The pipe clip as defined in claim 1 wherein said first interlocking securing means includes an upwardly directed projection outboard of an upwardly opening slot in an upper edge of each longitudinal plate opposite end said first interlocking securing means further includes a relieved area at each of two transversely adjacent corners of each of said transverse plates, each transverse plate is seated in spanning relationship between transversely adjacent pairs of said slots with a projection seated in an associated relieved area, said yoke has opposite ends, each transverse plate has an opening, and each yoke opposite end is received in one of said transverse plate openings.

15. The pipe clip as defined in claim 1 wherein said first interlocking securing means includes an upwardly directed projection outboard of an upwardly opening slot in an upper edge of each longitudinal plate opposite end, said first interlocking securing means further includes a relieved area at each of two transversely adjacent corners of each of said transverse plates, each transverse plate is seated in spanning relationship between transversely adjacent pairs of said slots with a projection seated in an associated relieved area, and each longitudinal plate has a longitudinally directed projection in overlying relationship to the associated transverse plate.

16. The pipe clip as defined in claim 1 wherein said first interlocking securing means includes an upwardly directed projection outboard of an upwardly opening slot in an upper edge of each longitudinal plate opposite end, said first interlocking securing means further includes a relieved area at each of two transversely adjacent corners of each of said transverse plates, each transverse plate is seated in spanning relationship between transversely adjacent pairs of said slots with a projection seated in an associated relieved area, and each longitudinal plate has a pair of oppositely longitudinally directed projections in overlying relationship to the associated transverse plate.

17. The pipe clip as defined in claim 1 wherein said first interlocking securing means includes an upwardly directed projection outboard of an upwardly opening slot in an upper edge of each longitudinal plate opposite end, said first interlocking securing means further includes a relieved area at each of two transversely adjacent corners of each of said transverse plates, each transverse plate is seated in spanning relationship between transversely adjacent pairs of said slots with a projection seated in an associated relieved area, each longitudinal plate has a longitudinally directed projection in overlying relationship to the associated transverse plate, said yoke has opposite ends, each transverse plate has an opening, and each yoke opposite end is received in one of said transverse plate openings.

18. The pipe clip as defined in claim 1 wherein said longitudinal plates are in spaced generally parallel relationship.

* * * * *